United States Patent
Klatt

(10) Patent No.: US 10,420,048 B2
(45) Date of Patent: Sep. 17, 2019

(54) RADIO NETWORK SYNCHRONIZATION OF A MOBILE COMMUNICATION NETWORK WITH A LOCAL CLOCK FUNCTIONALITY PROVIDING A LOCAL TIMING REFERENCE FOR EACH BASE STATION ENTITY

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 141 days.

(21) Appl. No.: 15/572,793

(22) PCT Filed: May 10, 2016

(86) PCT No.: PCT/EP2016/060374
§ 371 (c)(1),
(2) Date: Nov. 9, 2017

(87) PCT Pub. No.: WO2016/180801
PCT Pub. Date: Nov. 17, 2016

(65) Prior Publication Data
US 2018/0146442 A1    May 24, 2018

(30) Foreign Application Priority Data
May 12, 2015 (EP) ..................... 15167418

(51) Int. Cl.
*H04W 4/00* (2018.01)
*H04W 36/00* (2009.01)
(Continued)

(52) U.S. Cl.
CPC ..... *H04W 56/001* (2013.01); *H04W 36/0072* (2013.01); *H04W 36/08* (2013.01);
(Continued)

(58) Field of Classification Search
CPC ........... H04W 56/001; H04W 56/0015; H04W 36/0072; H04W 36/08; H04W 36/30; H04W 36/32
(Continued)

(56) References Cited

U.S. PATENT DOCUMENTS

2002/0141360 A1* 10/2002 Baba ................. H04W 36/0011
                                                               370/331
2008/0146235 A1*  6/2008 Kang ................ H04W 36/0077
                                                               455/437
(Continued)

FOREIGN PATENT DOCUMENTS

EP          2293629 A1        3/2011
EP          2651049 A1       10/2013
WO     WO-2012169840 A2 *   12/2012   ........ H04W 36/0055

*Primary Examiner* — Thai D Hoang
(74) *Attorney, Agent, or Firm* — Leydig, Voit & Mayer, Ltd.

(57) ABSTRACT

A method for radio network synchronization of a mobile communication network includes: in a first step, a first base station entity is the serving base station entity for a user equipment and requests the user equipment to execute a handover towards a second base station entity; in a second step, during the handover procedure of the user equipment towards the second base station entity, timing information is transmitted from the second base station entity—via the user equipment—to the first base station entity, wherein the timing information is indicative of the local timing reference of the second base station entity; and in a third step, subsequent to the second step, the timing information is used by the first base station entity to adjust the local timing reference of the first base station entity.

12 Claims, 1 Drawing Sheet

(51) Int. Cl.
*H04W 56/00* (2009.01)
*H04W 36/08* (2009.01)
*H04W 36/30* (2009.01)
*H04W 36/32* (2009.01)
*H04W 88/02* (2009.01)
*H04W 88/08* (2009.01)

(52) U.S. Cl.
CPC ........... *H04W 36/30* (2013.01); *H04W 36/32* (2013.01); *H04W 56/0015* (2013.01); *H04W 88/02* (2013.01); *H04W 88/08* (2013.01)

(58) Field of Classification Search
USPC ........................... 370/331–334; 455/436–444
See application file for complete search history.

(56) References Cited

U.S. PATENT DOCUMENTS

| | | | | |
|---|---|---|---|---|
| 2009/0111470 A1* | 4/2009 | Thakare | ............ | H04W 36/0055 455/436 |
| 2010/0103903 A1* | 4/2010 | Park | ................ | H04W 36/0033 370/331 |
| 2010/0189074 A1* | 7/2010 | Liao | ................ | H04W 36/0055 370/331 |
| 2010/0265968 A1* | 10/2010 | Baldemair | .......... | H04L 27/2662 370/503 |
| 2011/0007719 A1* | 1/2011 | Lee | ....................... | H04J 3/0682 370/336 |
| 2011/0103282 A1* | 5/2011 | Jeon | ...................... | H04W 52/40 370/311 |
| 2011/0206012 A1* | 8/2011 | Youn | ..................... | H04W 36/30 370/332 |
| 2012/0177006 A1 | 7/2012 | Tsai et al. | | |
| 2013/0059565 A1* | 3/2013 | Jung | ..................... | H04W 12/06 455/411 |
| 2014/0038612 A1* | 2/2014 | Wang | ................ | H04W 36/0083 455/436 |
| 2014/0112308 A1* | 4/2014 | Kwon | ............... | H04W 56/0005 370/331 |
| 2014/0219259 A1* | 8/2014 | Lin | ........................ | H04W 56/00 370/336 |
| 2015/0005027 A1* | 1/2015 | Zeng | ................ | H04W 72/1278 455/522 |

* cited by examiner

RADIO NETWORK SYNCHRONIZATION OF A MOBILE COMMUNICATION NETWORK WITH A LOCAL CLOCK FUNCTIONALITY PROVIDING A LOCAL TIMING REFERENCE FOR EACH BASE STATION ENTITY

CROSS-REFERENCE TO RELATED APPLICATIONS

This application is a U.S. National Phase application under 35 U.S.C. § 371 of International Application No. PCT/EP2016/060374, filed on May 10, 2016, and claims benefit to European Patent Application No. EP 15167418.1, filed on May 12, 2015. The International Application was published in English on Nov. 17, 2016 as WO 2016/180801 A1 under PCT Article 21(2).

FIELD

The present invention relates to a method for radio network synchronization of a mobile communication network, wherein the mobile communication network comprises a plurality of base station entities and at least one user equipment connected to the mobile communication network, wherein each of the plurality of base station entities comprises a local clock functionality providing a local timing reference for the respective base station entity.

Furthermore, the present invention relates to a mobile communication network for radio network synchronization of a mobile communication network, wherein the mobile communication network comprises a plurality of base station entities and at least one user equipment connected to the mobile communication network, wherein each of the plurality of base station entities comprises a local clock functionality providing a local timing reference for the respective base station entity Additionally, the present invention relates to a base station entity adapted to be used in connection with such a mobile communication network.

Furthermore, the present invention relates to a program and to a computer program product for radio network synchronization of a mobile communication network.

BACKGROUND

The problem of synchronization of network nodes or base station entities in a mobile communication network relates to the question of how radio access nodes (or base station entities) can be efficiently synchronized against each other in order to use radio resources in a more efficient way. In principle, this applies to all radio access technologies. Some modes of the LTE technology require an especially tight network synchronization in order to operate efficiently: The TDD (Time Division Multiplex) mode of operation is such an example where the timing, or at least the timing difference between two nodes (or base station entities) needs to be ensured (in an accurate manner) in order to allow the user equipment to use a defined timing for its operation.

Multiple methods of adjusting time drift between different radio nodes (or base station entities) are known today.

These methods include GNSS (Global Navigation Satellite System) based methods where the synchronization is performed to an external reference, normally provided by the GNSS system clock (such as a GPS system clock). These methods require the base station entities to be equipped, respectively, with suitable receivers (e.g. GPS receivers), which are, on the one hand, costly to purchase and install and, on the other hand, only (or mainly) usable outdoors.

As the network nodes, not only of a mobile communication network but of computer networks in general, need to be tightly synchronized in order to be able to properly work, a number of methods to realize the synchronization of network nodes have been proposed: E.g., the Network Time Protocol or the Precision Time Protocol.

The Network Time Protocol (NTP) is a networking protocol for clock synchronization between network nodes of a computer systems over packet-switched, variable-latency data networks and is intended to synchronize all participating computers to within a few milliseconds of a given time base. For synchronization purposes between the network nodes of a mobile communication network, this accuracy of a few milliseconds is not sufficient.

The Precision Time Protocol (PTP)—also known as IEEE 1588 is a protocol used to synchronize clocks of connected network nodes of a computer system such as the base station entities of a mobile communication network. Using the Precision Time Protocol, it is possible to attain accuracies beyond those attainable using NTP or for applications without access to a GPS (Global Positioning System) signal.

However, using the Precision Time Protocol requires using within each network node of the mobile communication network that needs the precise time base, i.e., within each base station entity—a precision clock, hence a comparably expensive hardware component (being able to maintain a certain timing reference with a certain accuracy).

When using the PTP for mobile communication networks to adjust time drifts between base station entities, a reference timing from a server is used to convey this timing information via the backhaul to the respective radio nodes. However, the advent of small cells—also for usage indoors—places new requirements on the synchronization methods as GPS does normally not work indoors or is simply too costly and the PTP (or IEEE1588) might not always be available over the low tier backhaul connections some (indoor) small cells are connected to.

SUMMARY

In an exemplary embodiment, the present invention provides a method for radio network synchronization of a mobile communication network. The mobile communication network comprises a plurality of base station entities and at least one user equipment connected to the mobile communication network, wherein each of the plurality of base station entities comprises a local clock functionality providing a local timing reference for the respective base station entity. In order for a first base station entity among the plurality of base station entities to obtain an indication about the timing reference of a second base station entity among the plurality of base station entities, a handover procedure is triggered by the first base station entity and for a user equipment—from the first base station entity to the second base station entity. The method comprises the followings steps: in a first step, the first base station entity is the serving base station entity for the user equipment and requests the user equipment to execute a handover towards the second base station entity; in a second step, during the handover procedure of the user equipment towards the second base station entity, timing information is transmitted from the second base station entity—via the user equipment—to the first base station entity, wherein the timing information is indicative of the local timing reference of the second base station entity; and in a third step, subsequent to the second step, the timing information is used by the first base station entity to adjust the local timing reference of the first base station entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
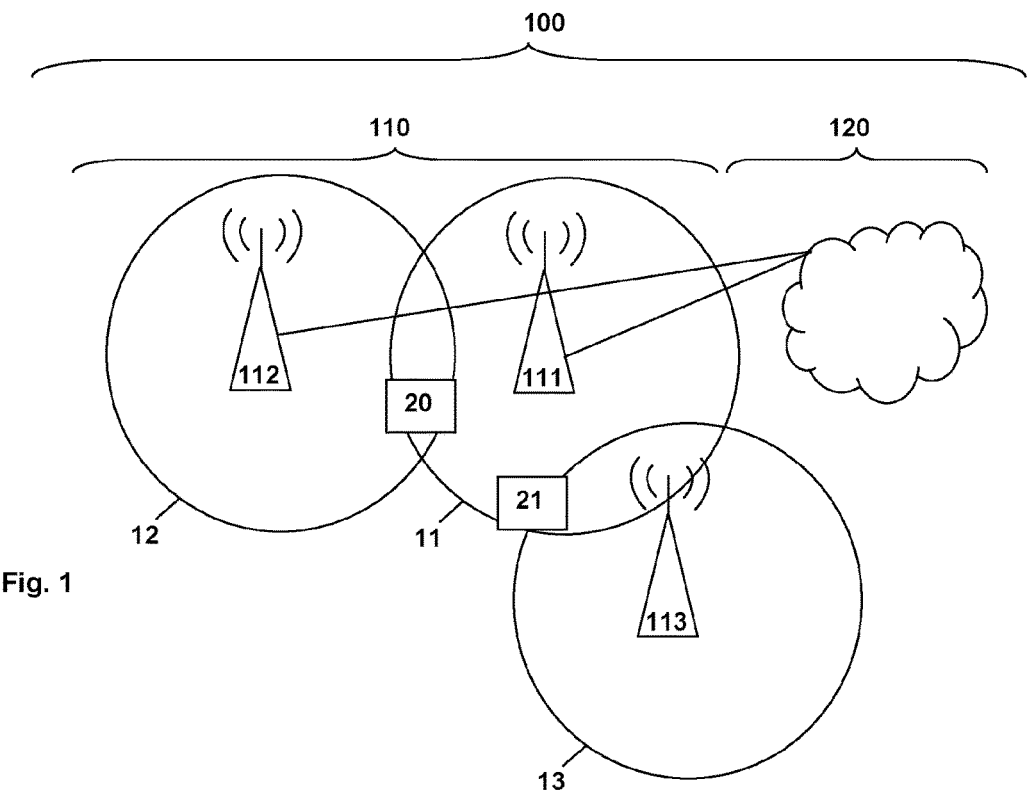
FIG. 1 schematically illustrates a mobile communication network having a plurality of base station entities and a plurality of telecommunication devices (user equipments).

Exemplary embodiments of the present invention provide a technically simple, effective and especially cost effective solution for radio network synchronization of a mobile communication network such that, on the one hand, it is guaranteed that the timing reference used by each network node of the mobile communication network is sufficiently correct and stable, and that, on the other hand, this can be achieved using comparably inexpensive hardware components. Exemplary embodiments of the present invention therefore provide for the possibility of a serving base station entity to execute a handover procedure at a time when the synchronization procedure should be triggered, and on the other hand, increase the accuracy of timing drift information by increasing the number of handover procedures between a defined peer set of radio nodes.

In an exemplary embodiment, the present invention provides a method for radio network synchronization of a mobile communication network, wherein the mobile communication network comprises a plurality of base station entities and at least one user equipment connected to the mobile communication network, wherein each of the plurality of base station entities comprises a local clock functionality providing a local timing reference for the respective base station entity, wherein in order for a first base station entity among the plurality of base station entities to obtain an indication about the timing reference of a second base station entity among the plurality of base station entities, a handover procedure is triggered—by the first base station entity and for the user equipment—from the first base station entity to the second base station entity, wherein the method comprises the followings steps:

in a first step, the first base station entity is the serving base station entity for the user equipment and requests the user equipment to execute a handover towards the second base station entity, in a second step, during the handover procedure of the user equipment towards the second base station entity, timing information is transmitted from the second base station entity—via the user equipment—to the first base station entity, the timing information being indicative of the local timing reference of the second base station entity, in a third step, subsequent to the second step, the timing information is used by the first base station entity to adjust the local timing reference of the first base station entity.

It is thereby advantageously possible according to the present invention that the first base station entity is able to review its time base (i.e. the local timing reference) based on the timing information received from the user equipment, wherein this timing information depends on the time base (or the local timing reference) of the second base station entity. Thereby, a timing adjustment or synchronization is able to be performed among the first and second base station entity. Hence, the present invention addresses a method allowing to synchronize at least two radio nodes (or base station entities) of a public land mobile network (PLMN) via a predictable forced inter-node handover procedure. The method according to the present invention allows a radio access network (RAN) to perform a synchronization procedure (in order to provide for a time synchronization between network nodes, i.e., base station entities of the mobile communication network) by forcing at least one commercial terminal equipment (or user equipment) to perform a handover procedure at a defined time. Preferably, it is also possible to predefine the handover target (i.e., the target base station entity of the handover procedure) as part of that procedure.

The method according to the present invention is based on terminal based synchronization procedures which allow—e.g. for LTE technology (Long Term Evolution) as radio access technology for fourth generation mobile communication networks, but also for other radio access technologies such as GSM (Global System for Mobile communication used in second generation mobile communication networks) or UMTS (Universal Mobile Telecommunication System used in third generation mobile communication networks)—to use a generic handover procedure to get knowledge of the timing drift between the base station entities (e.g. eNodeBs in the case of LTE technology) involved in the handover procedure, i.e., there is no specific "synchronization procedure" newly defined (i.e. for synchronization purposes only), but the generic handover procedure (that is defined anyway in the context of the respective radio access technology) is used for synchronization purposes, i.e., in other situations than it would normally be used.

An advantage of the method and/or the mobile communication network and/or base station entity according to the present invention compared to current methods and/or systems is that any (serving) base station entity having implemented an exemplary embodiment of the inventive method (or any mobile communication network being provided such that at least part of the involved base station entities have implemented an exemplary embodiment of the inventive method or are working according to an exemplary embodiment of the inventive method) is able—in order to obtain timing information for synchronization purposes—to trigger handover procedures at a suitable point in time (i.e., at a time when synchronization should be performed for the serving base station entity)

related to suitable normal user equipments (i.e. commercial user equipments), and towards suitable target base station entities.

Hence, such handover procedures are triggered by the serving base station entity merely for the purpose of obtaining the timing information for synchronization purposes. The possibility, according to the present invention, to trigger the handover event with regard to a suitable user equipment also implies that the serving base station entity can choose a user equipment among the user equipments it is currently serving. It is advantageously possible according to the present invention that preferably user equipments chosen are stationary and/or are moving only slowly (i.e., having a "track record" (in the sense of being detected, by the serving base station entity, based on evaluating radio frequency reception conditions) of being stationary and/or of moving only slowly).

According to the present invention, the mobile communication network comprises a plurality of base station entities, and each of the plurality of base station entities comprises a local clock functionality providing a local timing reference for the respective base station entity. It is supposed that a user equipment is connected to the mobile communication network via a first base station entity, i.e., the first base station entity is the serving base station entity for the user equipment. In order for the first (or serving) base station entity to obtain an indication about the timing reference of a second base station entity (especially a neighboring base station entity), a handover procedure is triggered—by the first (or serving) base station entity and for the user equipment—from the first base station entity to the second base station entity: In a first step, the user equipment is requested to execute a handover towards the second base station entity. In a second step (during this handover procedure), timing information is transmitted from the second base station entity—via the user equipment—to the first (or serving) base station entity, the timing information being indicative of the local timing reference of the second base station entity. In a third step, subsequent to the second step, the timing information is used by the first (or serving) base station entity to adjust the local timing reference of the first base station entity.

Thereby, it is advantageously possible that the synchronization of the (serving) base station entity (and hence the overall level or synchronization within the mobile communication network) can be enhanced.

According to a preferred embodiment of the present invention, the mobile communication network comprises a third base station entity among the plurality of base station entities, wherein in order for the first base station entity to obtain an indication about the timing reference of the third base station entity, a further handover procedure is triggered—by the first base station entity and for either the user equipment or a further user equipment—from the first base station entity to the third base station entity, wherein during the further handover procedure of the user equipment or the further user equipment towards the third base station entity, further timing information is transmitted from the third base station entity—via the user equipment or the further user equipment—to the first base station entity, the further timing information being indicative of the local timing reference of the third base station entity, wherein the further timing information is used by the first base station entity to adjust the local timing reference of the first base station entity.

Thereby, it is advantageously possible that in addition to the timing information obtained by the first (i.e. serving) base station entity from the second base station entity—the first (or serving) base station entity is able to obtain the further timing information obtained from the third base station entity. Hence, it is advantageously possible according to the present invention that the local timing reference of the first (or serving) base station entity can be adjusted not only based on the timing information (of the second base station entity) but also based on the further timing information (of the third base station entity). Thereby, it is advantageously possible to adjust the local timing reference of the first base station entity—at least potentially—in a more accurate manner and/or in a manner such that the overall functionality of the mobile communication network is enhanced. Of course, it is also possible and preferred according to the present invention that—in addition to obtaining the timing information from the second base station entity and the further timing information from the third base station entity—additional timing information are obtained, by the first (or serving) base station entity, from further base station entities (i.e., a fourth base station entity and/or a fifth base station entity and/or a sixth base station entity). According to the present invention, all these target base station entities (i.e. the second base station entity, the third base station entity and/or the further (or additional) base station entities) are necessarily neighboring or adjacent base station entities with respect to the first (or serving) base station entity. The further handover procedure (towards the third base station entity as target base station entity) typically either refers to the same user equipment that also conducted (or is or was involved in) the handover procedure (towards the second base station entity as target base station entity), or to another user equipment (i.e. the further user equipment). In case that different user equipments are used for the different handover procedure, it is advantageously possible to conduct or to trigger the handover procedures almost in parallel (i.e. timely at least partially overlapping) which results in obtaining the timing information (from the second base station entity) and the further timing information (from the third base station entity) almost at the same time which could be advantageous in view of accurately adjusting the local timing reference of the first base station entity.

According to the present invention, it is furthermore preferred that the handover procedure is triggered even though the radio reception conditions that the user equipment detects of the first base station entity and of the second base station entity are superior to a first radio reception level indicative of the radio reception conditions and/or the further handover procedure is triggered even though the radio reception conditions that the user equipment or the further user equipment detects of the first base station entity and of the third base station entity are superior to a first radio reception level indicative of the radio reception conditions, wherein the first radio reception level is superior to a second radio reception level indicative of the radio reception conditions, wherein a mobility related handover is triggered in case that radio reception conditions of the user equipment are detected that are inferior to the second radio reception level, wherein the first radio reception level corresponds especially to −70 dBm reference signal received power (RSRP) in LTE and/or wherein the second radio reception level corresponds especially to −90 dBm reference signal received power in LTE.

It is thereby advantageously possible that the handover procedure and/or the further handover procedure is or are conducted in a situation of comparably good radio reception conditions, i.e., the signal level of the reception signals, at the first (or serving) base station entity, is comparably high such that data, and hence also the timing information (and/or the further timing information) can be transmitted reliably using the user equipment and/or the further user equipment. This means that the handover procedure (and/or the further handover procedure) is triggered despite the fact that the radio reception conditions seen by the user equipment (or the further user equipment) of, on the one hand, the first base station entity, and, on the other hand, the second base station entity and/or the third base station entity) the first base station entity and of the third base station entity are superior to a first radio reception level indicative of the radio reception conditions, i.e., despite the fact that the radio reception conditions (seen by the user equipment (or the further user equipment) with respect to the first and second and/or first and third base station entity) are comparatively good. Especially, these radio conditions are better than radio reception conditions (second radio reception level) that would normally trigger the respective user equipment to request a handover. Preferably, the radio reception conditions are superior to a predefined radio reception level (first radio reception level) that is considerably "higher" (i.e. that corresponds to better radio reception conditions) than compared with the second radio reception level.

According to the present invention, it is preferred that the handover procedure is triggered only in case that the difference between, on the one hand, the radio reception conditions that the user equipment detects of the first base station entity, and, on the other hand, the radio reception conditions that the user equipment detects of the second base station entity is inferior to a difference threshold value and/or wherein the further handover procedure is triggered only in case that the difference between, on the one hand, the radio reception conditions that the user equipment or the further user equipment detects of the first base station entity, and, on the other hand, the radio reception conditions that the user equipment or the further user equipment detects of the third base station entity is inferior to a difference threshold value.

It is thereby advantageously possible that the handover procedure and/or the further handover procedure is or are conducted in a situation of comparably equal radio reception conditions of the source base station entity and of the target base station entity (i.e.—for the handover procedure—relating to the radio reception conditions seen by the user equipment of the first (serving) base station entity and the second (target) base station entity and/or—for the further handover procedure—relating to the radio reception conditions seen by the user equipment (and/or the further user equipment) of, on the one hand, the first base station entity (as serving base station entity) and, on the other hand, the second base station entity and/or the third base station entity (as target base station entity), such that data, and hence also the timing information (and/or the further timing information) can be transmitted reliably using the user equipment and/or the further user equipment.

According to a preferred embodiment of the present invention, the handover procedure is triggered only in case that the user equipment is detected, by the first base station entity, as being stationary or quasi-stationary and/or wherein the further handover procedure is triggered only in case that the user equipment and/or the further user equipment is detected, by the first base station entity, as being stationary or quasi-stationary.

Thereby, it is advantageously possible that the quality of the timing information (and/or the further timing information) is not reduced due to a movement (or at least a comparably fast movement) of the user equipment and/or of the further user equipment. In this respect, quality of the timing information and/or of the further timing information refers to the fact that in case of a movement of the user equipment and/or of the further user equipment different radio signal propagation conditions will probably apply dependent on the current location of the user equipment and/or of the further user equipment that will be reflected by the content of the timing information and/or the further timing information, i.e., at a further point in time (in a situation that the user equipment and/or the further user equipment has changed its location), the corresponding pieces of timing information might be less comparable due to the variation of the location of the user equipment and/or of the further user equipment than without such a variation of the location of the user equipment and/or of the further user equipment.

According to a further preferred embodiment of the present invention, the first base station entity receives a power supply information from the user equipment, the power supply information indicating that the user equipment is in a mains supply powered state, wherein the handover procedure is triggered only in case that the user equipment indicates a mains supply powered state and/or wherein the first base station entity receives a further power supply information from the further user equipment, indicating that the further user equipment is in a mains supply powered state, wherein the further handover procedure is triggered only in case that the further user equipment indicates a mains supply powered state.

Thereby, it is advantageously possible that an exemplary embodiment of the inventive method does not have any negative consequences on the user equipment and/or on the further user equipment, e.g., due to increased power consumption due to the execution of such additional handover procedures performed merely for synchronization purposes and not triggered by mobility requirements of the respective user equipment.

According to a further preferred embodiment of the present invention, the handover procedure is triggered only in case that the user equipment was originally in IDLE or is in CONNECTED mode in a dormant state where no data transfer is currently active and/or wherein the further handover procedure is triggered only in case that the user equipment and/or the further user equipment was originally in IDLE or in CONNECTED mode in a dormant state where no data transfer is currently active.

Thereby, it is advantageously possible that an exemplary embodiment of the inventive method does not have any negative consequences on the performance or the service level provided to a user of the user equipment and/or on the further user equipment, e.g. due to any interruptions of data connections and/or reductions of available transmission bandwidths due to the execution of such additional handover procedures performed merely for synchronization purposes and not triggered by the respective user equipment.

According to a further preferred embodiment of the present invention, the handover procedure and/or the further handover procedure are executed only for the purpose of network synchronization between the first base station entity and the second base station entity and/or between the first base station entity and the third base station entity.

Thereby, it is advantageously possible that a better timing reference is available at the first base station entity and hence a better network synchronization of the mobile communication network.

According to still a further embodiment of the present invention, in case that the user equipment and/or the further user equipment is able to receive signals of a global navigation satellite system (GNSS), and deduce a timing reference from the global navigation satellite system, the timing reference from the global navigation satellite system is transmitted to the first base station entity.

Thereby, it is advantageously possible, according to the present invention, to additionally enhance the quality of the timing information provided to the first base station entity.

Furthermore, the present invention relates to a mobile communication network for radio network synchronization of the mobile communication network, wherein the mobile communication network comprises a plurality of base station entities and at least one user equipment connected to the mobile communication network, wherein each of the plurality of base station entities comprises a local clock functionality providing a local timing reference for the respective base station entity, wherein in order for a first base station entity among the plurality of base station entities to obtain an indication about the timing reference of a second base station entity among the plurality of base station entities, a handover procedure is triggered—by the first base station entity and for the user equipment—from the first base station entity to the second base station entity, wherein the mobile communication network is configured such that:

the first base station entity is the serving base station entity for the user equipment and requests the user equipment to execute a handover towards the second base station entity, during the handover procedure of the user equipment towards the second base station entity, timing information is transmitted from the second base station entity—via the user equipment—to the first base station entity, the timing information being indicative of the local timing reference of the second base station entity, the timing information is used by the first base station entity to adjust the local timing reference of the first base station entity.

Thereby, it is advantageously possible to provide a mobile communication network such that the first base station entity is able to review its time base (i.e., the local timing reference) based on the timing information received from the user equipment, wherein this timing information depends on the time base (or the local timing reference) of the second base station entity.

According to a further preferred embodiment of the present invention—especially with respect to an exemplary embodiment of the inventive mobile communication network—, the mobile communication network comprises a third base station entity among the plurality of base station entities, wherein in order for the first base station entity to obtain an indication about the timing reference of the third base station entity, a further handover procedure is triggered—by the first base station entity and for either the user equipment or a further user equipment—from the first base station entity to the third base station entity, wherein the mobile communication network is configured such that during the further handover procedure of the user equipment or the further user equipment towards the third base station entity, further timing information is transmitted from the third base station entity—via the user equipment or the further user equipment—to the first base station entity, the further timing information being indicative of the local timing reference of the third base station entity, wherein the further timing information is used by the first base station entity to adjust the local timing reference of the first base station entity.

Thereby, it is advantageously possible according to the present invention that—in addition to the timing information obtained by the first (i.e. serving) base station entity from the second base station entity—the first (or serving) base station entity is able to obtain the further timing information obtained from the third base station entity.

Furthermore, the present invention relates to a base station entity for radio network synchronization of a mobile communication network, wherein the mobile communication network comprises a plurality of base station entities and at least one user equipment connected to the mobile communication network, wherein each of the plurality of base station entities comprises a local clock functionality providing a local timing reference for the respective base station entity, wherein in order for the base station entity among the plurality of base station entities to obtain an indication about the timing reference of a second base station entity among the plurality of base station entities, a handover procedure is triggered—by the first base station entity and for the user equipment—from the first base station entity to the second base station entity, wherein the base station entity is configured such that:

the base station entity is the serving base station entity for the user equipment and requests the user equipment to execute a handover towards the second base station entity, during the handover procedure of the user equipment towards the second base station entity, timing information is transmitted from the second base station entity—via the user equipment—to the base station entity, the timing information being indicative of the local timing reference of the second base station entity, the timing information is used by the base station entity to adjust the local timing reference of the base station entity.

Additionally, the present invention relates to a program comprising a computer readable program code which, when executed on a computer and/or on a base station entity or on a plurality of base station entities of a mobile communication network and/or on a user equipment, or in part on a base station entity or in part on a plurality of base station entities of a mobile communication network and/or in part on a user equipment, causes the computer and/or base station entity and/or the plurality of base station entities and/or user equipment to perform an exemplary embodiment of the inventive method.

Still additionally, the present invention relates to a computer program product for radio network synchronization of a mobile communication network, the computer program product comprising a computer program stored on a storage medium, the computer program comprising program code which, when executed on a computer and/or on a base station entity or on a plurality of base station entities of a mobile communication network and/or on a user equipment, or in part on a base station entity or in part on a plurality of base station entities of a mobile communication network and/or in part on a user equipment, causes the computer and/or base station entity and/or the plurality of base station entities and/or user equipment to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, is schematically shown, the mobile communication network 100 comprising an access network 110 and a core network 120. The mobile communication network 100 is preferably a cellular telecommunications network comprising typically a plurality of network cells (or radio cells), wherein three network cells (or radio cells) are represented in FIG. 1 by reference signs 11, 12 and 13. The mobile communication network 100 typically comprises a plurality of user equipments or telecommunication devices. The plurality of user equipments or of telecommunication devices are referred to by reference signs 20, 21, wherein reference sign 20 refers to a user equipment (also called first user equipment or first telecommunication device), and reference sign 21 refers to a further user equipment (also called second user equipment or second telecommunication device). The access network 110 of the mobile communication network 100 comprises, in the exemplary representation of FIG. 1, a first base station entity 111, serving the (first) radio cell 11. Furthermore, a second base station entity 112, serving the neighbor (second) radio cell 12, is schematically shown. Additionally, a third base station entity 113, serving a further neighbor radio cell 13, is schematically shown. The base station entities 111, 112, 113 are typically base stations, base transceiver stations or base station entities, e.g., a NodeB or an eNodeB base transceiver stations.

Typically base station entities 111, 112 and 113 are not time-synchronized but run an independent timing from each other. There are a number of known technology approaches to get timing information at the base transceiver station in order to synchronize multiple base station entities (or base transceiver stations) against each other. Methods typically comprise GPS based methods or backhaul based methods (e.g. IEEE1588 standard).

It is already known that the timing difference between a handover execution at a source base transceiver station (of a handover procedure), e.g., at the first base station entity 111, and the arrival time at the target base transceiver station, e.g., at the second base station entity 112, is transmitted to the serving base station entity (i.e. the first base station entity 111) such that the serving base station entity 111 (or original source eNB) also receives an information (e.g., an access signal) from the user equipment 20 being handed over to the target eNB, such as the second base station entity 112), and is, hence, able to calculate the relative timing information between the handover command issued (corresponding to the timing (or timing reference) of the source base transceiver station 111) and the time (or timing reference) of the initial access of the user equipment (or terminal device) 20 to the second base station entity 112 (or second base transceiver station 112). If the second base transceiver station 112 indicates its own timing back to the (serving) source base transceiver station 111, e.g., by using the X2 interface of LTE technology, the source base transceiver station 111 can calculate the timing difference and adjust its own transmission timing in a way that the overall system timing is synchronized.

Another characteristic of a synchronized mobile communication network (or radio network) is that the timing between the involved eNBs (or base station entities 111, 112, 113) is not necessarily precise over a longer time. The timing of each individual node drifts away due to the limited precision of used components like oscillators or the like. Therefore, a periodical re-assessment (and re-adjustment) of the timing and a resulting adjustment is performed in order to keep the radio access system (access network 110) operating in a synchronized manner.

Hence, each of the plurality of base station entities 111, 112, 113 comprises a local clock functionality providing a local timing reference for the respective base station entity. The local time bases of the base station entities 111, 112, 113 typically deviate (or drift) in time if there is no synchronization procedure applied, i.e. in reality, the timing of the individual radio cells (i.e. the timing (or local timing reference) of the respective base station entity 111, 112, 113 is not aligned and thus the mobile communication network 100 is not synchronous, potentially leading a reduced level of functionality of the mobile communication network 100.

In order for (e.g.) the first base station entity 111 to get or maintain a sufficient level of synchronization with the neighboring base station entities 112, 113, the first base station entity 111 may use an indication about the timing reference of the other base station entities, i.e., the second base station 112 entity and/or the third base station entity 113.

According to the present invention, it is proposed—in order to provide this indication about the timing reference of the other base station entities to the first base station entity 111 that the first base station entity 111 triggers a handover procedure that the user equipment 20 conducts from the first base station entity to the second base station entity, wherein the first base station entity 111 is assumed to be the serving base station entity 111 of the user equipment 20 and wherein the second base station entity 112 is assumed to be a reachable target base station entity for the user equipment 20. It is assured that the second base station entity 112 is a reachable potential target base station entity for the user equipment 20 due to the user equipment 20 transmitting corresponding information (e.g. the neighbor cell list, etc.) to the serving (i.e. the first) base station entity 111 according to the standard communication between the serving base station entity 111 and the user equipment 20.

In the course of the handover procedure triggered by the first (serving) base station entity 111, timing information is transmitted from the second base station entity 112 via the user equipment 20—to the first base station entity 111. The timing information is indicative of the local timing reference of the second base station entity 112 (i.e. typically obtained by the internal clock of the second base station entity 112 and/or obtained in other ways, e.g., a GPS reception capability of the second base station entity 112). Subsequently, the timing information is used by the first base station entity 111 to adjust the local timing reference of the first base station entity 111.

In the context of the present invention, adjusting especially also means verifying the local timing reference of the first base station entity 111, e.g. detecting whether the local timing reference differs sufficiently from timing reference of the second base station entity 112. If this is the case, an adaption of the local timing reference of the first base station entity 111 takes place.

According to the present invention, the first base station entity 111 is allowed to trigger a handover procedure with respect to the first user equipment 20 (such as a commercial terminal equipment) at any point in time, preferably to a defined known and preselected target radio node such as the second base station entity 112 (and/or the third base station entity 113).

According to the present invention, it is proposed that a re-synchronisation is performed between a plurality of base transceiver stations (or base station entities 111, 112, 113) by involving user equipments 20, 21 (or terminal devices), but not solely relying on handovers (or handover events) which occur for mobility or load balancing reasons, but which are executed especially (or exclusively) for the purpose of re-synchronizing the mobile radio access network.

Preferably, the handover procedures are executed using terminal equipments (user equipments 20, 21) that are not moving and connected to a permanent power supply. This increases the accuracy of the timing estimation and does not involve a negative impact to the customers resulting in decrease battery power.

Furthermore preferably, the two radio nodes between those a handover procedure for time synchronization should be performed are very different in receptions quality or at least only different to a defined max. reception level difference (difference threshold value).

Even further preferably, the handover procedure for time synchronization is used in situations such that the involved terminal device (or user equipments 20, 21) is not in a current data session in order to not impact any ongoing service for the user.

Additionally, it is proposed according to the method according to the present invention that, additionally to obtaining the timing information from the second base station entity 112 (and/or to obtaining the further timing information from the third base station entity 113), the user equipment or user equipments 20, 21 (i.e. the terminals) are used to re-sync the first base station entity 111 (i.e. serving the user equipment(s) 20, 21), and hence the mobile radio network. According to this alternative embodiment of the present invention, a procedure is triggered towards the user equipment 20 which is as such equipped to generate precise timing information (e.g. equipped with GPS capabilities or other Global Navigation Satellite System (GNSS) capabilities) such that the user equipment 20 is used to transmit such a precise timing information towards the (serving) first base station entity 111 (e.g. as an answer to a message enquiry from the first base station entity 111. In such an embodiment, the user equipment 20 (or terminal equipment), for example, could receive a GPS timing signal and play this back to the asking base transceiver station, the base transceiver station can poll another terminal device also supporting GPS and thus would get two time information which can be used to synchronize its components towards a single information source. For such a procedure, the Rx-to-Tx time difference (as defined for UMTS in [3GPP TS 25.331]) can be used as corrective parameter.

Figure 2:
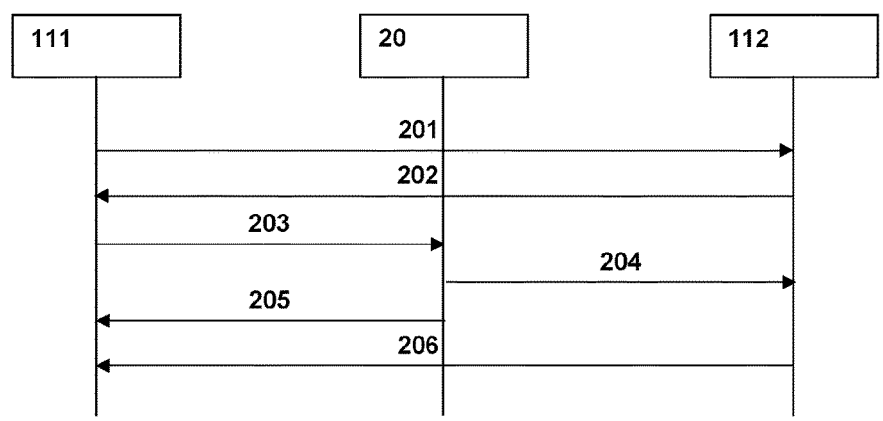
FIG. 2 schematically illustrates the exchange of information between the first base station entity, the user equipment, and the second base station entity.

In FIG. 2, the exchange of information between the first base station entity 111, the user equipment 20, and the second base station entity 112 is schematically illustrated. The first base station entity 111 is considered the currently serving eNB (i.e., the base station entity), and it triggers a handover procedure toward the user equipment 20 (or terminal device) at a given point in time although there is no need from the point of view of the radio conditions to perform a handover of the user equipment 20 towards the second base station entity 112 (i.e., the neighboring eNB).

Initially, the serving base station entity 111 might inquire at the potential target base station entity (second base station entity 112) whether a handover procedure can be triggered (first and second message 201, 202 requesting and acknowledging this).

Upon a positive answer by the second base station entity 112 (via the second message 202), through a third message 203, the user equipment 20 is triggered to perform the handover procedure towards the second base station entity 112. Via a fourth message 204 and a fifth message 205, the handover procedure is performed and the timing information transmitted to the first base station entity 111. Via a sixth message from the second base station entity 112 to the first base station entity 111, additional pieces of information are transmitted to the first base station entity 111.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for radio network synchronization of a mobile communication network, wherein the mobile communication network comprises a plurality of base station entities and at least one user equipment connected to the mobile communication network, wherein each of the plurality of base station entities comprises a local clock functionality providing a local timing reference for the respective base station entity, wherein in order for a first base station entity among the plurality of base station entities to obtain an indication about the timing reference of a second base station entity among the plurality of base station entities, a handover procedure is triggered—by the first base station entity and for a user equipment—from the first base station entity to the second base station entity, wherein the method comprises the followings steps:

in a first step, the first base station entity is the serving base station entity for the user equipment and requests the user equipment to execute a handover towards the second base station entity;

in a second step, during the handover procedure of the user equipment towards the second base station entity, timing information is transmitted from the second base station entity—via the user equipment—to the first base station entity, wherein the timing information is indicative of the local timing reference of the second base station entity; and in a third step, subsequent to the second step, the timing information is used by the first base station entity to adjust the local timing reference of the first base station entity.

2. The method according to claim 1, wherein the mobile communication network comprises a third base station entity among the plurality of base station entities, wherein:

in order for the first base station entity to obtain an indication about the timing reference of the third base station entity, a further handover procedure is triggered—by the first base station entity and for either the user equipment or a further user equipment in the at least one user equipment—from the first base station entity to the third base station entity;

wherein during the further handover procedure of the user equipment or the further user equipment towards the third base station entity, a further timing information is transmitted from the third base station entity—via the user equipment or the further user equipment—to the first base station entity, wherein the further timing information is indicative of the local timing reference of the third base station entity, and wherein the further timing information is used by the first base station entity to adjust the local timing reference of the first base station entity.

3. The method according to claim 2, wherein:
the handover procedure is triggered even though radio reception conditions that the user equipment detects of the first base station entity and of the second base station entity are superior to a first radio reception level indicative of the radio reception conditions; and/or
the further handover procedure is triggered even though the radio reception conditions that the user equipment or the further user equipment detects of the first base station entity and of the third base station entity are superior to a first radio reception level indicative of the radio reception conditions;
wherein the first radio reception level is superior to a second radio reception level indicative of the radio reception conditions, wherein a mobility related handover is triggered in case that radio reception conditions of the user equipment are detected that are inferior to the second radio reception level.

4. The method according to claim 2, wherein:
the handover procedure is triggered in response to a difference between radio reception conditions that the user equipment detects of the first base station entity, and radio reception conditions that the user equipment detects of the second base station entity being inferior to a difference threshold value; and/or
the further handover procedure is triggered in response to a difference between radio reception conditions that the user equipment or the further user equipment detects of the first base station entity, and radio reception conditions that the user equipment or the further user equipment detects of the third base station entity being inferior to the difference threshold value.

5. The method according to claim 2, wherein:
the handover procedure is triggered in response to the user equipment being detected, by the first base station entity, as being stationary or quasi-stationary; and/or the further handover procedure is triggered in response to the user equipment and/or the further user equipment being detected, by the first base station entity, as being stationary or quasi-stationary.

6. The method according to claim 2, wherein:
the first base station entity receives a power supply information from the user equipment, wherein the power supply information indicates that the user equipment is in a mains supply powered state, wherein the handover procedure is triggered in response to the user equipment indicating the mains supply powered state; and/or
the first base station entity receives a further power supply information from the further user equipment, indicating that the further user equipment is in the mains supply powered state, wherein the further handover procedure is triggered in response to the further user equipment indicating the mains supply powered state.

7. The method according to claim 2, wherein:
the handover procedure is triggered in response to the user equipment was originally being in IDLE or being in CONNECTED mode in a dormant state where no data transfer is currently active; and/or
the further handover procedure is triggered in response to the user equipment and/or the further user equipment was originally being in IDLE or being in CONNECTED mode in a dormant state where no data transfer is currently active.

8. The method according to claim 2, wherein the handover procedure and/or the further handover procedure are executed for network synchronization between the first base station entity and the second base station entity and/or between the first base station entity and the third base station entity.

9. The method according to claim 2, wherein in case that the user equipment and/or the further user equipment is able to receive signals of a global navigation satellite system (GNSS) and deduce a timing reference from the GNSS, the timing reference from the GNSS is transmitted to the first base station entity.

10. A mobile communication network comprising:
a plurality of base station entities; and
at least one user equipment connected to the mobile communication network;
wherein each of the plurality of base station entities comprises a local clock functionality providing a local timing reference for the respective base station entity;
wherein in order for a first base station entity among the plurality of base station entities to obtain an indication about the timing reference of a second base station entity among the plurality of base station entities, the first base station entity is configured to trigger a handover procedure is for the user equipment from the first base station entity to the second base station entity;
wherein the first base station entity is configured to be the serving base station entity for the user equipment and to request the user equipment to execute a handover towards the second base station entity;
wherein during the handover procedure of the user equipment towards the second base station entity, the second base station entity is configured to transmit timing information—via the user equipment- to the first base station entity, the timing information being indicative of the local timing reference of the second base station entity;

wherein the first base station entity is configured to use the timing information to adjust the local timing reference of the first base station entity.

11. The mobile communication network according to claim 10, wherein the mobile communication network further comprises:
a third base station entity among the plurality of base station entities, wherein in order for the first base station entity to obtain an indication about the timing reference of the third base station entity, the first base station entity is configured to trigger a further handover procedure-for either the user equipment or a further user equipment—from the first base station entity to the third base station entity;
wherein during the further handover procedure of the user equipment or the further user equipment towards the third base station entity, the third base station entity is configured to transmit further timing information via the user equipment or the further user equipment- to the first base station entity, the further timing information being indicative of the local timing reference of the third base station entity, wherein the further timing information is usable by the first base station entity to adjust the local timing reference of the first base station entity.

12. A non-transitory computer-readable medium having processor-executable instructions stored thereon for radio network synchronization of a mobile communication network, wherein the mobile communication network comprises a plurality of base station entities and at least one user equipment connected to the mobile communication network, wherein each of the plurality of base station entities comprises a local clock functionality providing a local timing reference for the respective base station entity, wherein in order for a first base station entity among the plurality of base station entities to obtain an indication about the timing reference of a second base station entity among the plurality of base station entities, a handover procedure is triggered— by the first base station entity and for a user equipment— from the first base station entity to the second base station entity, wherein the processor-executable instructions, when executed, facilitate performance of the following steps:
in a first step, the first base station entity is the serving base station entity for the user equipment and requests the user equipment to execute a handover towards the second base station entity;
in a second step, during the handover procedure of the user equipment towards the second base station entity, timing information is transmitted from the second base station entity—via the user equipment—to the first base station entity, wherein the timing information is indicative of the local timing reference of the second base station entity; and
in a third step, subsequent to the second step, the timing information is used by the first base station entity to adjust the local timing reference of the first base station entity.

\* \* \* \* \*